United States Patent Office

3,850,974
Patented Nov. 26, 1974

3,850,974
PRODUCTION OF NITRILES
Glen D. Lichtenwalter, Hinsdale, and Edgar S. Hammerberg, Chicago, Ill., assignors to Akzona Incorporated, Asheville, N.C.
No Drawing. Filed May 23, 1973, Ser. No. 362,967
Int. Cl. C07c 121/10
U.S. Cl. 260—465 B    14 Claims

ABSTRACT OF THE DISCLOSURE

Disclosed is a process for producing fatty acid nitriles by reacting ammonia and a fatty acid. The process is continuous and is carried out in liquid phase. Most advantageously, the nitriles are produced in good yields by only a single pass through the reaction chamber. This reduces the need for complex auxiliary apparatus such as vaporizers and catalyst chambers.

BACKGROUND OF THE INVENTION

Presently, nitriles are produced commercially by reacting fatty acid with ammonia at 300° C. at a pressure of 70 to 100 p.s.i. in countercurrent fashion by introducing acid at the top of a reactor and $NH_3$ at the bottom. The nitrile is removed as a liquid from the bottom of the reactor in conversions of 70 to 90%. A by-product of this reaction is the corresponding amide. Subsequently, the liquid mixture of amide fatty acid nitrile is vaporized and passed through a chamber containing a dehydration catalyst where the conversion to nitrile is essentially complete. A typical dehydration catalyst is aluminum oxide. Patents describing this process, modifications thereof, or useful dehydration catalysts include U.S. Pats. 2,794,043; 2,493,637; and 2,808,426. Further information concerning production of nitriles is presented in *Progress in the Chemistry of Fats and Other Lipids*, H. J. Harwood, Vol. 1, 1952, pp. 132–136.

DESCRIPTION OF THE INVENTION

The invention comprises reacting ammonia gas with a fatty acid (liquid under reaction conditions) containing from 8 to 24 carbon atoms by a continuous liquid-phase reaction in the presence of a dehydration catalyst. The reaction is carried out by passing the acid and ammonia countercurrently through a staged reactor fitted with means for impeding back-flow of liquids present in the reaction mixture. Water formed during the reaction is continuously removed in the stream of ammonia gas passing through the reactor, e.g., by vaporization. During reaction, the temperature of the reactants is maintained at from 300 to 380° C., depending upon the boiling point of the acid feed employed, and the pressure in the reaction vessel is maintained at a sufficient level to prevent volatilization of the liquid components of the reaction mixture such as unreacted acid, amide, and nitrile. The molar ratio of ammonia to acid (ammonia/RCOOH) should be at least 1.1, i.e., the acid is reacted with at least a small excess of ammonia on a stoichiometric basis. The ammonia/RCOOH molar ratio can also be allowed to go as high as three, although there does not appear to be great advantage in doing this.

Following reaction, the product nitrile is removed from the reactor as a liquid phase and can be subsequently distilled if desired to separate the nitrile from residual components of the reaction mixture such as small amounts of unreacted acid, amide, and various types of dimeric nitriles produced when the acid feed contains large amounts (i.e., >10%) of polyunsaturated acids as in the case of tall oil and soybean acids. Water removed from the reactor in the effluent gas stream is separated from the ammonia by condensation and if desired, the residual ammonia gas can be recycled to the reactor.

In comparison with prior art methods, the present invention has many advantages. For example, good conversions of acid to the corresponding nitrile are obtained in a single pass through the reactor thereby eliminating the need for additional apparatus such as vaporizing chamber and catalyst chambers which are employed in current commercial processes for producing fatty nitriles on a continuous basis. The invention is also efficient in that no energy is expended in volatilizing the fatty acid since the reaction occurs in the liquid phase. In addition, the invention employs only a small excess of ammonia rather than the large excesses of 4 to 6 moles employed in prior art processes.

A further significant advantage arises from the fact that high molecular weight fatty acids can be readily converted to nitriles. Such acids include fish-derived fatty acids, erucic acid, and phenylstearic acid. Because of the difficulty and inherent inefficiency associated with volatilizing relatively high molecular weight fatty acids, prior art processes run in vapor phase or requiring vaporization were not readily applicable to such acids. In the present invention, liquid phase operation is essential and therefore the invention is useful for processing the higher molecular weight acids into their corresponding nitriles.

While conditions of temperature and pressure, and the type of catalyst employed, play a role in the success of the invention, the use of various means to impede back-flow of the liquid phase reactants is thought to be especially significant. In current processes and especially those involving a single conversion step, it is customary to use large excesses of ammonia, i.e., 5 and even 6 times the stoichiometric amount required. These large excesses are though to provide heat to the reaction but even more importantly, the reaction mixture contains large amounts of water formed as a by-product in the reaction, and the ammonia is used to volatilize this water and remove it from the reaction mixture. The necessity for removing water is apparent from the chemistry of the reaction which is believed to proceed in accordance with the following formulas:

1. $RCOOH + NH_3 \rightleftharpoons RCOONH_4$
2. $RCOONH_4 \rightleftharpoons RCONH_2 + H_2O$
3. $RCONH_2 \rightleftharpoons RCN + H_2O$ From equations 2 and 3 it can be seen that two moles of water are produced for each mole of acid reacted. Since all the reactions involved are reversible, it is necessary to remove these large amounts of water to avoid hydrolysis of the nitrile back to the amide or soap stage, i.e., removal of water serves to push the reaction equilibrium in favor of nitrile formation.

In conventional processes, the reactants are allowed to become mixed, especially through back-flow of one portion of the reaction mixture into earlier portions wherein the concentration of water is larger. Thus, to push the reaction equilibrium in favor of nitrile formation, large excesses of ammonia are required to remove the water. The improved results of the present invention are belived to arise because back-flow and back-mixing of the liquid phase reaction mixture are impeded. Therefore, advancing phases of the liquid reaction mixture contain progressively diminished amounts of water and consequently less ammonia is required to volatilize water and advance the reaction equilibrium toward nitrile formation. This greatly increases the reaction efficiency of the ammonia. Stated differently, it can be seen that reduced back-mixing increases the efficiency of the ammonia because once water of reaction is produced, it is vaporized and removed rather than being permitted to flow back and hinder the reaction taking place in preceding portions of the reaction mixture.

To impede back-mixing, the reaction is carried out in a reactor which is staged in that it is fitted with various mechanical means to prevent or impede recirculation. For example, the use of a bubble-cap column is highly effective. The acid is fed as a liquid into the top of the column (usually after having been preheated) and the ammonia is fed into the bottom of the column. The ammonia passes upward through the column while the acid feed flows downward by gravity from level to level. At each level, the liquid acid is retained briefly where it reacts with ammonia. As formed, the water of reaction is efficiently volatilized and removed in the ammonia gas stream. There is little, if any, recirculation or back-flow of liquid phases from different levels in the reactor. The nitrile content at each level in the column progressively increases until immediately prior to exiting, the liquid phase consists essentially of nitrile with only minor amounts (i.e., from 1 to 8%) of unreacted acid, amide, and ammonium soaps being present. At this point, the molar ratio

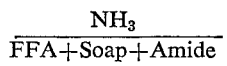

may be as high as 100/1 (FFA=Free fatty acid).

As an alternative means, the invention can be carried out in a packed column wherein the physical presence of the packing itself serves to impede back-flow and recirculation of the liquid phase. While back-flow is perhaps greater than in the bubble-cap column, a packed column presents certain advantages in that circulation of the ammonia is greater, there is greater contact between the acid and the ammonia, and the through-put of the packed column is generally greater than in a bubble-cap column. Also, the low vapor velocity of ammonia may be detrimental in a large commercial bubble-cap column.

Suitable types of column packing include glass beads (1/8" or less in diameter), various types of pelletized inorganic mineral packings, fine wire gauze such as that available from the Goodloe Company known as Goodloe Packing, particulate ceramic material (e.g., burrow saddles, Raschig Rings, etc.), and small pelletized alumina spheres (1/8" or less in diameter) such as those available from the Kaiser Aluminum Company. This last type of packing is especially advantageous in that the alumina can also serve as a dehydration catalyst in which case it is unnecessary for the acid feed to contain catalyst, such as zinc oxide.

It will, of course, be apparent that a wide variety of dehydration catalysts may be employed in the nitrile-forming reaction. See, for example, U.S. Pats. 2,493,637; 2,511,603; and 2,388,218, incorporated herein by reference. Usually, a small amount of the catalyst, e.g., 0.02 to 0.2% (based on the weight of the feed) is slurried or dissolved in the acid feed stock. Typical of such catalysts are zinc oxide, $ZrO_2$, $ThO_2$, or diatomaceous earth. Catalysts which are soluble in the acid feed include the zinc, and other heavy metal salts of fatty acids, specific examples of which are the zinc salts of coconut oil fatty acids, soya bean fatty acids, stearic acid, palmitic acid, oleic acid, tallow acids, and the like.

The aliphatic acids which can be converted to nitriles by this process can be saturated or unsaturated acids having from 8 to 24 carbon atoms. This group of acids includes caprylic, pelargonic, capric, undecylinic, lauric, tridecylic, myristic, pentadecylic, palmitic, margaric, stearic, monodecyclic, arachidic, behenic, oleic, elaidic, and other higher aliphatic acids normally found in natural fats and oils, or produced by hydrolysis of such oils, e.g. coconut fatty acid, palm acids, tallow fatty acid, and soybean acids. Synthetic or partially synthetic fatty acids can also be employed, e.g., phenylstearic acid and tall oil acids. In processing the above acids, some thought should be given to the amount of polyunsaturated acids present in the feed. Many fatty acids derived from plant sources, e.g., soybean, linseed, tall oil and cotton seed acids, contain appreciable quantities of polyunsaturated acids such as linoleic and linolenic and the presence of these polyunsaturates tends to reduce yields because of formation of various high molecular weight nitriles which are difficult to distill. Therefore, although vegetable fatty acids can be reacted in the invention, the yields, while very acceptable, are less than for saturated or monounsaturated acids.

In processing fatty acids, the residence time in the reactor is generally from 10 to 60 minutes. Where the reactor is a bubble-cap column, the through-put is less and the residence times tend to be longer, e.g., 30 minutes to 1 hour. For packed columns, the residence time is generally about ½ hour or less.

EXAMPLE I

A bubble cap column was constructed of type 304 stainless steel. The diameter was one inch and there were twenty trays, one inch high, each containing a single bubble cap. The liquid depth on each tray one one-half inch. Fatty acid was fed to the top tray of the column. The column was heated with electrical heaters. The heaters raised the fatty acid to the reaction temperature and provided the endothermic heat of reacion (150 B.t.u./lb. for tallow acids). Ammonia was fed from a cylinder via calibrated rotameter to the bottom tray of the reactor. Water and unreacted ammonia were removed at the top via a back pressure valve which was adjusted to control the operating pressure. Nitrile was removed at the bottom of the reactor.

Initial runs were made with oleic acid, ZnO-containing tallow acids, ZnO-containing crude coconut acids, and ZnO-containing crude soya acids. The reaction conditions and results are presented in Table I. Except for coco nitrile runs, all runs were made at 2/1 moles of ammonia to fatty acid and 50 p.s.i.g. pressure. The temperature was held 310-320° C. and the feed rate at 150 grams/hour.

The importance of ZnO catalyst is readily apparent by comparing Runs 1 and 2. Under the same conditions, conversion to nitrile was essentially complete in the presence of ZnO and only 65-70% in its absence.

The oleic, tallow, and soya types all produced nitrile in >95% conversion. Conversion of coco acids, on the other hand, required two passes through the reactor which is a reflection of the lower molecular weight of coco acids. Longer retention times would be necessary to effect conversion in a single pass.

The amount of pitch produced in these runs was determined by distilling the crude nitriles and weighing the still bottoms. The high pitch content of crude soya acids is a reflection of the large amount of polyunsaturates present in these acids. The polyunsaturates appear mainly as dimer acid nitrile in the crude nitrile. Accordingly, in the present invention, best results are obtained where the amount of unsaturated acids in the feed is a minimum, e.g., less than 10%.

Additional runs were carried out on soya acids, tall oil acids, coconut acids, and phenylstearic acid. The results are given in Table II.

Both soya and tall oil acids gave high pitch yields on distillation, a generally expected result based on their high polyunsaturation, i.e., >10%.

To study the effect of various process variables, e.g., excess ammonia, other runs were carried out. The results are given in Table III. From Table III it can be seen that only a slight excess of ammonia is required in the process. Caprylic acid was fed to the nitrile unit but the nitrile could not be held in the liquid state because of its low boiling point. All fatty product was therefore removed from the top of the column along with water of reaction. Surprisingly, the fatty product was essentially all nitrile of very high purity. Volatilization problems would be overcome by use of higher reaction pressures and use of reaction vessels designed to withstand such pressures.

TABLE I

| Run | Acid feed type | Mole ratio, NH₃/FA | Temp., °C | Pressure, p.s.i.g. | Percent ZnO catalyst | Feed, g./hr. | Analysis of crude product, percent | | | | | |
|---|---|---|---|---|---|---|---|---|---|---|---|---|
| | | | | | | | FFA* | Soap | Amide | Nitrile (diff.) | Nitrile by I.R. | Percent pitch |
| 1 | Oleic | 2/1 | 310-320 | 50 | None | 150 | 4.53 | 0.5 | 30.2 | 64.8 | 69 | |
| 2 | do | 2/1 | 310-320 | 50 | 0.25 | 150 | 0.27 | 0.52 | 0.76 | 98.5 | 100 | 3.5 |
| 3 | Tallow | 2/1 | 310-320 | 50 | 0.125 | 150 | 0.55 | 1.26 | 2.4 | 95.8 | 96 | 8.5 |
| 4¹ | Coco | 1.6/1 | 310-320 | 75 | 0.125 | 150 | 1.55 | 2.72 | 10.8 | 84.9 | | |
| 5 | | 1.4/1 | 310-320 | 75 | 0.215 | 215 | 0.307 | 1.72 | 1.35 | 96.6 | | 4.0 |
| 6 | Soya | 2/1 | 310-320 | 50 | 0.25 | 150 | 0.54 | 3.90 | | 95.6 | | 13.3 |

¹ Pass 1.
*FFA=Free Fatty Acid.

TABLE II

| Run | Mole ratio, NH₃/RCOOH | Residence time | | Press., p.s.i.g. | Temp., °C | Catalyst, ZnO | Analysis of crude, percent | | | | Distillation of crude | | |
|---|---|---|---|---|---|---|---|---|---|---|---|---|---|
| | | Min. | Grams/hr. | | | | FFA | Soap | Amide | Total | Percent distillate | Total FFA plus soap plus amide | Percent res. |
| ZnO soya acid | | | | | | | | | | | | | |
| 7 | 2/1 | 60 | 150 | 50 | 310-320 | None added | .54 | 3.9 | | 4.44 | 86.3 | 0.93 | 13.3 |
| 8 | 1.5/1 | 45 | 191 | 75 | 330-340 | .1% added | .32 | 1.4 | 3.2 | 4.9 | | | |
| 9 | 1.5/1 | 60 | 150 | 100 | 330-340 | None added | 1.41 | 2.03 | 3.625 | | 84.3 | 1.27 | 15.2 |
| 10 | 1.5/1 | 90 | 96.5 | 100 | 310-320 | do | .06 | .754 | 2.31 | 3.12 | 86.1 | 1.25 | 13.5 |
| 11* | 1.5/1 | 90 | 96.5 | 100 | 310-320 | .1% added | .15 | .28 | 3.48 | 3.91 | 91 | 2.5 | 8.2 |
| 12 | 1.5/1 | 60 | 145 | 100 | 330-340 | None added | .15 | 1.5 | 1.72 | 3.37 | 76 | 1.27 | 23.2 |
| Tall oil acid | | | | | | | | | | | | | |
| 13 | 1.5/1 | 60 | 145 | 100 | 330-340 | 0.1% | .07 | .73 | 1.21 | 2.01 | 78.8 | 1.07 | 20.7 |
| Coconut acid | | | | | | | | | | | | | |
| 14 | 2/1 | 80 | 108.5 | 75 | 310-320 | Added .125% | 1.48 | .46 | 4.3 | 10.38 | | | |
| 15 | 1.5/1 | 78 | 111 | 100 | 330-340 | None added | .43 | 1.52 | 2.29 | 4.24 | | | |
| 16 | 1.5/1 | 90 | 96.5 | 100 | 330-340 | do | .32 | 1.08 | 3.45 | 4.84 | 95.5 | 2.08 | 3.3 |
| Phenylstearic acid | | | | | | | | | | | | | |
| 17 | 1.5/1 | 50 | 182 | 100 | 330-340 | 0.1% | 0.23 | 0.35 | 1.49 | 2.07 | 96.9 | 1.08 | 2.2 |

*Feed was distilled soya acid.

TABLE III

Oleic acid

| Run | Mole ratio, NH₃/RCOOH | Residence time | | Pressure (p.s.i.g.) | Temp., °C | Catalyst conc., percent ZnO | Analysis | | | |
|---|---|---|---|---|---|---|---|---|---|---|
| | | Min. | Grams/hr. | | | | Percent | | | FFA plus soap plus amide |
| | | | | | | | FFA | Soap | Amide | |
| 18 | 1.5/1 | 60 | 145 | 35 | 310-320 | .015 | 1.46 | 1.23 | 15.5 | 18.19 |
| 19 | 1.5/1 | 60 | 145 | 35 | 330-340 | .025 | 2.71 | 0.58 | 16.4 | 19.69 |
| 20 | 1.1/1 | 60 | 145 | 75 | 330-340 | .075 | 0.55 | 0.57 | 3.24 | 4.36 |
| 21 | 1.5/1 | 120 | 72.5 | 75 | 310-320 | .025 | 0.18 | 0.28 | 4.48 | 4.94 |
| 22 | 1.5/1 | 120 | 72.5 | 75 | 330-340 | .075 | 0.06 | 0.43 | 1.34 | 1.83 |
| 23 | 1.1/1 | 120 | 72.5 | 35 | 330-340 | .025 | 0.58 | 0.71 | 3.94 | 5.23 |
| 24 | 1.1/1 | 120 | 72.5 | 35 | 310-320 | .075 | 0.67 | 0.88 | 6.64 | 8.19 |
| 25 | 1.1/1 | 60 | 145 | 75 | 310-320 | .025 | 2.43 | 0.56 | 21.2 | 24.19 |

EXAMPLE II

This example illustrates the use of a packed column in producing nitriles according to the present invention. The column employed consists of an externally heated type 316 stainless steel tube 30 inches long, 1⅛ inches in diameter. Fatty acid feed containing zinc oxide was taken from a holder and pumped through a preheater to the top of the reactor. Here it fell by gravity through the packing and into a product receiver. Ammonia was supplied from a heated ammonia holder and passed through a heated rotameter and superheater before entering the bottom of the column. Exit gases were removed from the top of the column through a knock-out condenser (which returned any entrained fat to the column) and were passed into a cooled, pressurized receiver. Because of the short column length, it was necessary to make multiple passes in order to achieve complete conversion to nitrile and simulate the action of a plant-size reactor. The type of packing as well as other process conditions are set forth in Table IV. In each run, the catalyst was 0.1% ZnO with the exception of run 33 where the alumina packing in the column was allowed to serve as catalyst.

TABLE IV

| Run | Type of feed | Packing | Feed rate, g./hr. | NH₃/RCOOH | Number of passes | Percent conversion | Pressure (p.s.i.g.) | Temperature, °C |
|---|---|---|---|---|---|---|---|---|
| 26 | Tallow acid | Glass beads ³ | 700 | 3/1 | 3 | 97.8 | 100 | 330-340 |
| 27 | do | do | 700 | 3/1 | 4 | 97.2 | 300 | 330-340 |
| 28 | Caprylic acid | do | 364 | 3/1 | 5 | 98.6 | 300 | 330-340 |
| 29 | do | Steel gauze ² | 1,090 | 1.5/1 | 5 | 96 | 300 | 330-340 |
| 30 | Coco | do | 1,950 | 1.42/1 | 6 | 94 | 300 | 330-340 |
| 31 | do | do | 1,090 | 1.5/1 | 3 | 99 | 300 | 370-380 |
| 32 | do | Alumina ⁴ | 1,950 | 1.42/1 | 6 | 96 | 300 | 330-340 |
| 33 | do¹ | do | 1,950 | 1.42/1 | 6 | 97 | 300 | 330-340 |

¹ Coconut acids obtained by steam splitting without use of catalyst.
² 316 stainless steel gauze rolled into cylindrical shape to fit the column.
³ ⅛ inch glass beads.
⁴ ⅛ inch hard alumina spheres sold by Kaiser Chemical Company.

A pilot reactor, identical to the laboratory reactor, except for a longer packed column, was set up. The column was 15 feet long with an I.D. of 1.049 inches. This was packed with 1600 g. of ¼″ x 8 mesh alumina balls. The column temperature was maintained between 330 and 340° C. and the pressure at 300 p.s.i.g. The steam split coco acid feed rate was 1725 g. per hour into the top of the column. The ammonia feed rate was 246 g. per hour into the bottom. The molar ratio of ammonia to acid was 1.74/1. At these conditions, the crude product analyzed 97.6% nitrile with 2.4% free fatty acid soap and amide.

What is claimed is:

1. In a method for the single stage conversion of a carboxylic acid selected from the group consisting of a fatty acid containing from 8 to 24 carbon atoms, a tall oil acid, and phenylstearic acid, in the liquid state, to the corresponding nitrile by reaction with gaseous ammonia in the presence of a dehydration catalyst, the improvement comprising the steps of:
    (a) reacting a downwardly moving stream of an acid selected from the group consisting of a fatty acid, a tall oil acid, and phenylstearic acid, in the liquid state, with an upwardly moving countercurrent stream of gaseous ammonia, in a single stage reaction zone, the molar ratio of ammonia to acid being between 1:1 and about 3:1, in the presence of a dehydration catalyst, the residence time of said reactants in said zone being between about 10 and about 60 minutes;
    (b) maintaining the temperature of the reactants in said zone between about 300° C. and about 380° C., the nitrile formed remaining in the liquid state, the temperature and flow rate of the gaseous ammonia being effective to maintain the water formed in the reaction in the vapor state and to effect reduced backmixing of the water and its removal from the reaction stage with substantially no condensation thereof and substantially to recirculation or back-flow of liquid phases in the reaction system.

2. A method as in claim 1 wherein the acid is coconut fatty acid.

3. A method as in claim 1 wherein the acid is soya fatty acid.

4. A method as in claim 1 wherein the acid is oleic acid.

5. A method as in claim 1 wherein the reaction zone is a column fitted with bubble-caps.

6. A method as in claim 1 wherein the reaction zone is a packed column wherein the packing is spherical $Al_2O_3$ beads.

7. A method as in claim 1 wherein the reaction zone is a packed column wherein the packing is particulate ceramic material.

8. A method as in claim 1 wherein the reaction zone is a packed column wherein the packing is metal gauze.

9. The method of claim 1 in which the catalyst is zinc oxide.

10. A method as in claim 1 and including the step of distilling the liquid phase removed from the reactor to separate nitrile therefrom.

11. A method as in claim 1 and including the step of removing water from the gaseous phase exiting from the reactor and recirculating the ammonia.

12. A method as in claim 1 wherein the acid is tallow fatty acid.

13. A method as in claim 1 wherein the acid is phenylstearic acid.

14. A method as in claim 1 wherein the acid is tall oil fatty acid.

References Cited
UNITED STATES PATENTS

| | | | |
|---|---|---|---|
| 2,205,076 | 6/1940 | Wortz | 260—465.2 |
| 2,314,894 | 3/1943 | Potts et al. | 260—465.2 |
| 2,414,393 | 1/1947 | Potts | 260—465.2 |
| 2,524,831 | 10/1950 | Potts | 260—465.2 |
| 2,526,044 | 10/1950 | Ralston et al. | 260—465.2 |
| 2,546,521 | 3/1951 | Potts | 260—465.2 X |
| 2,808,426 | 10/1957 | Potts et al. | 260—465.2 |
| 3,299,117 | 1/1967 | Potts | 260—465.2 |
| 3,661,970 | 5/1972 | Canavan | 260—465.2 |

JOSEPH PAUL BRUST, Primary Examiner

U.S. Cl. X.R.

260—465.2